United States Patent
Kuntz et al.

[19]
[11] Patent Number: 5,945,223
[45] Date of Patent: *Aug. 31, 1999

[54] FLOW COATING SOLUTION AND FUSER MEMBER LAYERS PREPARED THEREWITH

[75] Inventors: Alan R. Kuntz, Webster; Frank P. Sgabellone, Macedon; David E. Maxfield, Jr., Rochester; Anthony J. Formicola, Jr., Webster; Robert N. Finsterwalder, Webster; David M. Friel, Webster, all of N.Y.

[73] Assignee: Xerox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/822,521

[22] Filed: Mar. 24, 1997

[51] Int. Cl.$^6$ .......................... B32B 27/06; B32B 27/24; B32B 27/26; B32B 31/00

[52] U.S. Cl. .......................... 428/421; 428/422; 427/355; 427/407.1; 427/409; 399/330; 492/49; 492/56; 524/173; 524/233; 524/251

[58] Field of Search .................................... 428/421, 422, 428/36.9; 399/320, 324, 329, 330, 331; 430/97, 98, 99; 427/402, 407.1, 409, 420, 355; 492/49, 56

[56] References Cited

U.S. PATENT DOCUMENTS

| | | | |
|---|---|---|---|
| 3,507,844 | 4/1970 | Wood | 260/87.7 |
| 3,560,595 | 2/1971 | Phillips et al. | 260/900 |
| 3,944,689 | 3/1976 | Luckock et al. | 427/385 |
| 4,257,699 | 3/1981 | Lentx | 355/3 FU |
| 4,946,889 | 8/1990 | Nishioka | 524/544 |
| 5,017,432 | 5/1991 | Eddy et al. | 428/422 |
| 5,034,460 | 7/1991 | Nishioka | 525/72 |
| 5,035,950 | 7/1991 | Del Rosario | 428/421 |
| 5,217,837 | 6/1993 | Henry et al. | 430/124 |
| 5,332,641 | 7/1994 | Finn et al. | 430/124 |
| 5,338,587 | 8/1994 | Mammino et al. | 428/35.7 |
| 5,366,772 | 11/1994 | Badesha et al. | 428/35.8 |
| 5,370,931 | 12/1994 | Fratangelo et al. | 428/334 |
| 5,378,525 | 1/1995 | Yamamoto et al. | 428/192 |
| 5,501,881 | 3/1996 | Fuller et al. | 427/421 |
| 5,617,191 | 4/1997 | Murakami et al. | 399/286 |

FOREIGN PATENT DOCUMENTS

| | | |
|---|---|---|
| 0 815 950 A1 | 1/1998 | European Pat. Off. . |
| 7-178367 | 7/1995 | Japan . |
| 8-160759 | 6/1996 | Japan . |

OTHER PUBLICATIONS

Xerox Disclosure Journal, vol. 21, No. 2, Mar./Apr. 1996, pp. 185–186, entitled "Flow Coating Fixture".

Xerox Disclosure Journal—vol. 18, No. 3, May/Jun. 1993 entitled "Improved Viton to Silicone Rubber Adhesion", p. 253.

Xerox Disclosure Journal—vol. 21, No. 2, Mar./Apr. 1996 entitled "Flow Coating Fixture", pp. 185–186.

*Primary Examiner*—Vivian Chen

[57] ABSTRACT

A flow coating solution consisting essentially of a fluoroelastomer, a nucleophilic crosslinking agent, and an effective solvent selected from the group consisting of N-methyl 2-pyrrolidone, dimethyl formamide, and dimethyl sulfoxide, along with a fuser member containing a layer prepared from flow coating said flow coating solution.

21 Claims, 3 Drawing Sheets

FLOW COATING SOLUTION AND FUSER MEMBER LAYERS PREPARED THEREWITH

CROSS REFERENCE TO RELATED APPLICATIONS

Attention is directed to the following copending applications assigned to the assignee of the present application: U.S. Pat. No. 5,871832, "LEVELING BLADE FOR FLOW COATING PROCESS FOR MANUFACTURE OF POLYMERIC PRINTER ROLL AND BELT COMPONENTS;" U.S. application Ser. No. 08/672,493 filed Jun. 26, 1996, entitled, "FLOW COATING PROCESS FOR MANUFACTURE OF POLYMERIC PRINTER ROLL AND BELT COMPONENTS;" and U.S. application Ser. No. 08/824,576 filed Mar. 26, 1997, entitled, "FUSER MEMBER WITH AN AMINO SILANE ADHESIVE LAYER AND PREPARATION THEREOF." The disclosures of these applications are hereby incorporated by reference in their entirety.

BACKGROUND OF THE INVENTION

The present invention relates to coating solutions and fuser member layers, including methods for preparing the fuser member layers. More specifically, the present invention relates to coating solutions and fuser member layers prepared using the coating solutions, wherein the coating solutions comprise a fluoropolymer such as a fluoroelastomer, a crosslinking agent, and a polar solvent. Such fuser members can be used in electrostatographic reproducing apparatuses to fuse toner to a substrate.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 200° C. or higher depending upon the softening range of the particular resin used in the toner. It is undesirable, however, to increase the temperature of the substrate substantially higher than about 250° C. because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members. The fusing of the toner particles takes place when the proper combination of heat, pressure and contact time are provided. The balancing of these parameters to enable the fusing of the toner particles is well known in the art, and can be adjusted to suit particular machines or process conditions.

It is important in the fusing process that minimal or no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser, and accordingly it is desired to provide a fusing surface which has a low surface energy to provide the necessary release. To ensure and maintain good release properties of the fuser, it has become customary to apply release agents to the fuser roll during the fusing operation. Typically, these materials are applied as thin films of, for example, silicone oils to prevent toner offset.

The process for the preparation of such fuser members is important in maintaining desired fuser life. Known processes for providing surfaces of fuser members include two typical methods which are dipping of the substrate into a bath of coating solution or spraying the periphery of the substrate with the coating material. However, recently, Applicants have developed a process which involves dripping material spirally over a horizontally rotating cylinder. Generally, in this new flow coating method, the coating is applied to the substrate by rotating the substrate in a horizontal position about a longitudinal axis and applying the coating from an applicator to the substrate in a spiral pattern in a controlled amount so that substantially all the coating that exits the applicator adheres to the substrate. For specific details of an embodiment of the flow coating method, attention is directed to commonly assigned Attorney Docket Number D/96036, U.S. Pat. application Ser. No. 08/672,493 filed Jun. 26, 1996, entitled "Flow Coating Process for Manufacture of Polymeric Printer and Belt Components," the disclosure of which is hereby incorporated by reference in its entirety.

However, not all coatings are compatible with the new flow coating method. Specifically, only materials which can be completely dissolved in a solvent can be flow coated. Further, it is desirable that the material have the ability to stay dissolved during the entire flow coating process which may take up to approximately 8 hours or longer, and must stay dissolved during the manufacturing period which may be up to several days. Good results are not obtained with materials which tend to coagulate or crystallize within the time period required for flow coating, which may be on the order of about 8 hours and for production manufacturing, may be on the order of a few days, for example, from about 1 to about 4 days. It is important to use a material capable of being flow coated for an increased amount of time to enable flow coating in a manufacturing and production environment. It is very costly to periodically shut down a manufacturing line and change the solution delivery system. If the coating does not have the desired properties, the assembly line may need to be shut down often, for example, every hour or every few hours in order to clean the delivery line of coagulated or crystallized material. Therefore, it is desirable to use a material which has good flow coating properties in order to allow for manufacturing to continue for a long period of time, for example several days, without occurring the above problems in the procedure.

It is also desirable that the coating be slow drying to avoid trapping solvent in the under layers which tends to cause bubbles and solvent "pops." Bubbles result from trapped air in the coating which results in non-uniformity of coating and or surface defects. Solvent "pops" are defined as trapped air or solvent voids that rupture resulting in crater-like structures causing non-uniform coated areas or surface defects. In either case, these defects can act as initiation sites for adhesion failures.

Moreover, useful materials for the flow coating process must possess the ability to flow in a manner which allows for the entire roll to be coated. Therefore, it is desirable that the material possess a desired viscosity which allows it to flow over the entire surface of the member being coated. Along with these properties, it is desirable that the material to be coated possess a balance between viscosity and percent solids. Similarly, it is important that the coating material have the ability to completely dissolve in a solvent in order to prevent precipitation of the material which can lead to non-uniform flow coating, and imperfections in the final flow coated surface.

The balance between viscosity and percent solids is important to enable sufficient build rates which impact throughput and work in process. Build rates are defined as the thickness of a material that can be coated per unit time. The thickness of the material should allow for a balance between maintaining thickness uniformity and avoiding solvent "pops" and air bubbles. Throughput in the process is the number of units that are processed per unit time. Work in process (WIP) is the number of units currently in any one of the process stages from beginning to end. The objective is to maximize the build rate and reduce the throughput time and work in process.

Many materials known to be useful for outer coatings of a fuser member, such as, for example, silicone rubbers, fluoropolymers and fluoroelastomers, possess some of the above qualities necessary for flow coating. However, problems result once the fluoroelastomer is dissolved in a solvent and crosslinking or curing agents are added. For example, the curative or crosslinking agents tend to precipitate within minutes after addition to the solvent solutions. The precipitate causes numerous problems such as clogging the filters and pumps used in the flow coating process. Further, the entire fuser member cannot be coated due to early precipitation of the curing and/or crosslinking agent. In addition, early precipitation may lead to non-uniform flow coating and imperfections in the final flow coated surface.

U.S. Pat. Nos. 5,338,587 and 5,366,772 disclose mixing a fluoroelastomer with a nucleophilic curative and methyl ethyl ketone solvent and spray coating the solution onto the roll.

There exists a need for flow coating solutions for flow coating fuser member layers which possess the qualities necessary for sufficient flow coating including providing slow solidification following flow coating, possessing the ability to remain in solution without precipitation, and providing a sufficient balance between flowability, viscosity and percentage solids.

SUMMARY OF THE INVENTION

Examples of objects of the present invention include:

It is an object of the present invention to provide flow coating solutions, methods and apparatuses with many of the advantages indicated herein.

It is another object of the present invention to provide a flow coating solution which is able to be coated over an increased period of time in a manufacturing environment without precipitating, coagulating or crystallizing.

It is yet another object of the present invention to provide a flow coating solution which is slow drying following coating thereof.

Further, an object of the present invention is to provide a flow coating solution which provides a sufficient balance between flowability, viscosity and percentage solids.

In embodiments, the present invention relates to a flow coating solution comprising a fluoroelastomer, a nucleophilic crosslinking agent, and an effective solvent.

Other embodiments include: a fuser member comprising a substrate and a fluoroelastomer layer, wherein the fluoroelastomer layer is prepared by flow coating a flow coating solution to the substrate by rotating the substrate in a horizontal position about a longitudinal axis thereof and simultaneously applying the flow coating solution from an applicator to the substrate in a spiral pattern in a controlled amount so that substantially all the coating from the applicator adheres to the substrate, wherein the flow coating solution comprises a fluoroelastomer, a nucleophilic crosslinking agent, and an effective solvent.

Embodiments further include: a method of flow coating comprising coating a flow coating solution to a substrate by rotating the substrate in a horizontal position about a longitudinal axis thereof and simultaneously applying the flow coating solution from an applicator to the substrate in a spiral pattern in a controlled amount so that substantially all the coating from the applicator adheres to the substrate, wherein the flow coating solution comprises a fluoroelastomer, a nucleophilic crosslinking agent, and an effective solvent.

Embodiments also include: an image forming apparatus comprising: a charge-retentive surface to receive an electrostatic latent image thereon; a development component to apply toner to the charge-retentive surface to develop the electrostatic latent image to form a developed image on the charge retentive surface; a transfer component to transfer the developed image from the charge retentive surface to a copy substrate; and a fuser member for fusing toner images to a surface of the copy substrate, wherein the fuser member comprises: a substrate and a fluoroelastomer layer, wherein the fluoroelastomer layer is prepared by flow coating a flow coating solution on the substrate by rotating the substrate in a horizontal position about a longitudinal axis thereof and simultaneously applying the flow coating solution from an applicator to the substrate in a spiral pattern in a controlled amount so that substantially all the coating from the applicator adheres to the substrate, wherein the flow coating solution comprises a fluoroelastomer, a nucleophilic crosslinking agent, and an effective solvent.

The coating solutions herein allow for superior fuser member layers to be prepared due to the superior flow coating qualities possessed by the coating solutions including providing slow solidification following flow coating, possessing the ability to remain in solution without precipitation, and providing a sufficient balance between flowability, viscosity and percentage solids.

BRIEF DESCRIPTION OF THE DRAWINGS

For a better understanding of the present invention, reference may be had to the accompanying figures.

DETAILED DESCRIPTION OF THE PRESENT INVENTION

Figure 1:
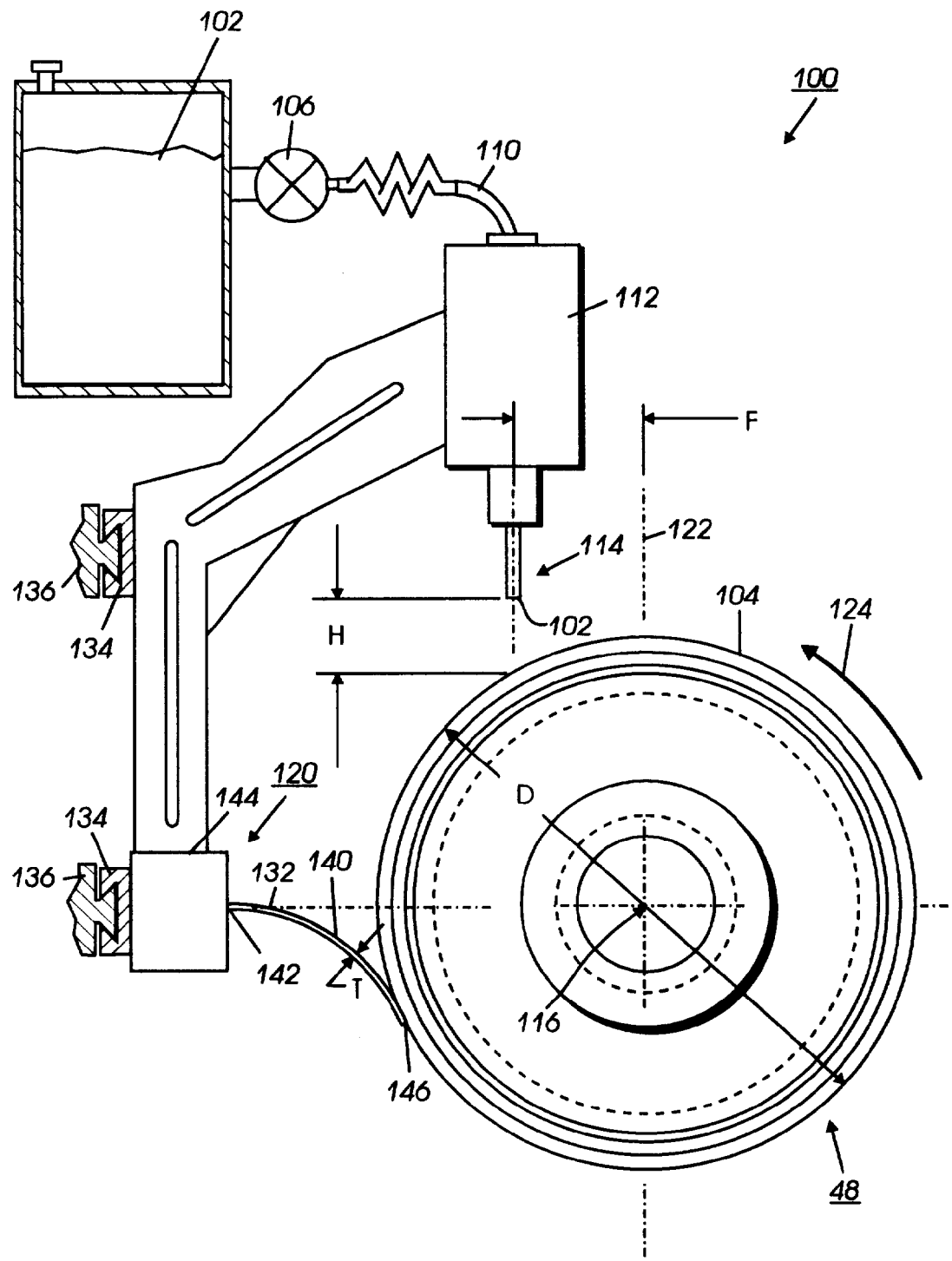
FIG. 1 is an end view of a flow coated fuser roll being prepared on a turning apparatus according to an embodiment of the present invention.

Fuser member as used herein refers to fuser members including fusing rolls, belts, films, and the like; donor members, including donor rolls, belts, films, and the like; and pressure members, including pressure rolls, belts, films, and the like; and other members useful in the fusing system of an electrostatographic or xerographic machine. It will become evident from the following discussion that the fuser member of the present invention may be employed in a wide variety of machines and is not specifically limited in its application to the particular embodiment depicted herein.

Any suitable substrate may be used as the substrate for the fuser member. The fuser member may be a roll, belt, flat surface or other suitable shape used in the fixing of thermoplastic toner images to a suitable copy substrate. It may take the form of a fuser member, a pressure member or a release agent donor member, preferably in the form of a cylindrical roll, belt or film. Typically, the roll fuser member is made of a hollow cylindrical metal core, such as copper, aluminum, steel, or certain plastic materials chosen to maintain rigidity, structural integrity, as well as being capable of having a fluoroelastomer coated thereon and adhered firmly thereto. It is preferred that the supporting substrate is a cylindrical sleeve having an outer layer of from about 1 to about 6 mm. In one embodiment, the core which may be a steel cylinder is degreased with a solvent and cleaned with an abrasive cleaner prior to being primed with a primer, such as Dow Corning 1200, which may be sprayed, brushed or dipped, followed by air drying under ambient conditions for thirty minutes and then baked at 150° C. for 30 minutes.

Examples of suitable fusing layers, such as outer fusing layer of the fuser member herein include polymers such as fluoropolymers, for example, polytetrafluoroethylene (PTFE), fluorinated ethylenepropylene copolymer (FEP), polyfluoroalkoxypolytetrafluoroethylene (PFA Teflon) and the like and copolymers, terpolymers or tetrapolymers thereof; silicone rubbers, including fluorosilicone; and elastomers such as fluoroelastomers. Preferred are elastomers such as fluoroelastomers. Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein these fluoroelastomers, particularly from the class of copolymers, terpolymers, and tetrapolymers of vinylidenefluoride, hexafluoropropylene and tetrafluoroethylene and a possible cure site monomer, are known commercially under various designations as VITON A®, VITON E®, VITON E60C®, VITON E430®, VITON 910®, VITON GH® and VITON GF®. The VITON® designation is a Trademark of E.I. DuPont de Nemours, Inc. Other commercially available materials include FLUOREL 2170®, FLUOREL 2174®, FLUOREL 2176®, FLUOREL 2177® and FLUOREL LVS 76®. FLUOREL® is a Trademark of 3M Company. Additional commercially available materials include AFLAS™ a poly(propylene-tetrafluoroethylene) and FLUOREL II® (LII1900) a poly(propylene-tetrafluoroethylenevinylidenefluoride) both also available from 3M Company, as well as the TECNOFLONS® identified as FOR-60KIR®, FOR-LHF®, NM® FOR-THF®, FOR-TFS®, TH®, TN505® available from Montedison Specialty Chemical Company. In another preferred embodiment, the fluoroelastomer is one having a relatively low quantity of vinylidenefluoride, such as in VITON GF®, available from E.I. DuPont de Nemours, Inc. The VITON GF® has 35 mole percent of vinylidenefluoride, 34 mole percent of hexafluoropropylene and 29 mole percent of tetrafluoroethylene with 2 percent cure site monomer. The cure site monomer can be those available from DuPont such as 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known, commercially available cure site monomer.

Examples of fluoroelastomers suitable for use herein for the outer layer of the fuser member of the present invention include fluoroelastomers of the above type, along with hydrofluoroelastomers including volume grafted elastomers. Volume grafted elastomers are a special form of hydrofluoroelastomer and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator. Examples of specific volume graft elastomers are disclosed in U.S. Pat. No. 5,166,031; U.S. Pat. No. 5,281,506; U.S. Pat. No. 5,366,772; and U.S. Pat. No. 5,370,931, the disclosures each of which are herein incorporated by reference in their entirety.

Volume graft, in embodiments, refers to a substantially uniform integral interpenetrating network of a hybrid composition, wherein both the structure and the composition of the fluoroelastomer and polyorganosiloxane are substantially uniform when taken through different slices of the fuser member. A volume grafted elastomer is a hybrid composition of fluoroelastomer and polyorganosiloxane formed by dehydrofluorination of fluoroelastomer by nucleophilic dehydrofluorinating agent followed by addition polymerization by the addition of alkene or alkyne functionally terminated polyorganosiloxane.

Interpenetrating network, in embodiments, refers to the addition polymerization matrix where the fluoroelastomer and polyorganosiloxane polymer strands are intertwined in one another.

Hybrid composition, in embodiments, refers to a volume grafted composition which is comprised of fluoroelastomer and polyorganosiloxane blocks randomly arranged.

Generally, the volume grafting according to the present invention is performed in two steps, the first involves the dehydrofluorination of the fluoroelastomer preferably using an amine. During this step, hydrofluoric acid is eliminated which generates unsaturation, carbon to carbon double bonds, on the fluoroelastomer. The second step is the free radical peroxide induced addition polymerization of the alkene or alkyne terminated polyorganosiloxane with the carbon to carbon double bonds of the fluoroelastomer. In embodiments, copper oxide can be added to a solution containing the graft copolymer. The dispersion is then provided onto the fuser member.

In embodiments, the polyorganosiloxane having functionality can be represented by the formula:

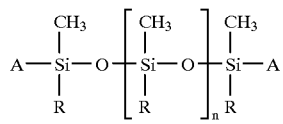

where R is an alkyl with, for example, from about 1 to about 24 carbons, or an alkenyl with, for example, from about 2 to about 24 carbons, or a substituted or unsubstituted aryl with, for example, from about 4 to about 18 carbons; A is an aryl with, for example, from about 6 to about 24 carbons, a substituted or unsubstituted alkene with, for example, from about 2 to about 8 carbons, or a substituted or unsubstituted alkyne with, for example, from about 2 to about 8 carbons; and n represents the number of segments and is, for example, from about 2 to about 400, and preferably from about 10 to about 200 in embodiments.

In preferred embodiments, R is an alkyl, alkenyl or aryl, wherein alkyl contains from about 1 to about 24 carbons, preferably from about 1 to about 12 carbons; alkenyl contains from about 2 to about 24 carbons, preferably from about 2 to about 12 carbons; and aryl contains from about 6 to about 24 carbon atoms, preferably from about 6 to about 18 carbons. R may be a substituted aryl group, wherein the aryl may be substituted with an amino, hydroxy, mercapto or substituted with an alkyl having for example from about 1 to about 24 carbons and preferably from 1 to about 12 carbons, or substituted with an alkenyl having for example from about 2 to about 24 carbons and preferably from about 2 to about 12 carbons. In a preferred embodiment, R is independently selected from methyl, ethyl, and phenyl. The functional group A can be an alkene or alkyne group having from about 2 to about 8 carbon atoms, preferably from about 2 to about 4 carbons, optionally substituted with an alkyl having for example from about 1 to about 12 carbons, and preferably from about 1 to about 12 carbons, or an aryl group having for example from about 6 to about 24 carbons, and preferably from about 6 to about 18 carbons. Functional group A can also be mono-, di-, or trialkoxysilane having from about 1 to about 10 and preferably from about 1 to about 6 carbons in each alkoxy group, hydroxy, or halogen. Preferred alkoxy groups include methoxy, ethoxy, and the like. Preferred halogens include chlorine, bromine and fluorine. A may also be an alkyne of from about 2 to about 8 carbons, optionally substituted with an alkyl of from about 1 to about 24 carbons or aryl of from about 6 to about 24 carbons. The group n is a number, for example, of from about 2 to about 400, and in embodiments from about 2 to about 350, and preferably from about 5 to about 100. Furthermore, in a preferred embodiment n is from about 60 to about 80 to provide a sufficient number of reactive groups to graft onto the fluoroelastomer. In the above formula, typical R groups include methyl, ethyl, propyl, octyl, vinyl, allylic crotnyl, phenyl, naphthyl and phenanthryl, and typical substituted aryl groups are substituted in the ortho, meta and para positions with lower alkyl groups having from about 1 to about 15 carbon atoms. Typical alkene and alkenyl functional groups include vinyl, acrylic, crotonic and acetenyl which may typically be substituted with methyl, propyl, butyl, benzyl, tolyl groups, and the like.

The amount of fluoroelastomer used to provide the outer layer of the fuser member of the present invention is dependent on the amount necessary to form the desired thickness of the layer or layers of fuser member. It is preferred that the outer fusing layer be coated to a thickness of from about 6 to about 12 mils, preferably from about 7 to about 10 mils. Specifically, the fluoroelastomer for the outer layer is added in an amount of from about 10 to about 40 percent, preferably about 15 to about 35 percent by weight of total solids. Total solids as used herein in reference to the outer fluoroelastomer layer refers to the total amount of fluoroelastomer, dehydrofluorinating agent, solvent, adjuvants, fillers, crosslinking agent, and conductive fillers.

Conductive fillers may be dispersed in a fusing layer of the fuser member of the present invention. In a preferred embodiment a metal oxide or carbon black is dispersed in the fluoroelastomer surface. A preferred metal oxide is one which is capable of interacting with the functional groups of the polymeric release agent to form a thermally stable film which releases the thermoplastic resin toner and prevents the toner from contacting the elastomer material itself. In addition, it is important that the metal oxide be substantially non-reactive with the elastomer so that no substantial dehydrofluorination of the vinylidenefluoride in the polymer may take place. A preferred metal oxide is cupric oxide, which has been found to be a weak base and softens rather than hardens the elastomer with time thereby maintaining good copy quality. Another preferred metal oxide is aluminum oxide. In a particularly preferred embodiment, fillers include a combination of aluminum oxide and cupric oxide. Other metal oxide options include nickel oxide, ferric oxide, manganese oxide, molybdenum oxide, and the like. The metal oxide is typically present in an amount of from about 5 to 30 parts by weight per hundred parts of the polymer although it is preferred to have from about 10 to 20 parts by weight of metal oxide. In addition, the particle size of the metal oxide is important and it should not be so small as to interfere with the curing of the polymer nor so large as to supply an insufficient number of particles disbursed throughout the elastomer surface for good release properties. Typically, the metal oxide particles have a mean diameter of from about 2 to 10 microns, preferably 6 microns.

The dehydrofluorinating agent which attacks the fluoroelastomer generating unsaturation is selected from basic metal oxides such as MgO, CaO, Ca(OH)$_2$ and the like, and strong nucleophilic agents such as primary, secondary and tertiary, aliphatic and aromatic amines, where the aliphatic and aromatic amines have from about 2 to about 30 carbon atoms. Also included are aliphatic and aromatic diamines and triamines having from about 2 to about 30 carbon atoms where the aromatic groups may be benzene, toluene, naphthalene, anthracene, and the like. It is generally preferred for the aromatic diamines and triamines that the aromatic group be substituted in the ortho, meta and para positions. Typical substituents include lower alkyl amino groups such as ethylamino, propylamino and butylamino, with propylamino being preferred.

In the case of flow coating the fluoroelastomer and crosslinking agent, it is desirable that the elastomer and crosslinking agent dissolve completely in the solvent and remain dissolved throughout the flow coating procedure. It is further necessary that the fluoroelastomer and/or curing agent dissolved in solvent strike a balance between flowability and viscosity as described above. Also, it is desirable for the flow coating solution to have. a suitable balance of viscosity and evaporation rate (drying) to enable single pass uniform thickness coatings which impact throughput and adhesion performance.

A solvent suitable for dissolving a fluoroelastomer is be used in the present invention. Further, a crosslinking or curing agent is used to stimulate crosslinking of the fluoroelastomer. The solvent must have the ability to thoroughly dissolve the fluoroelastomer into solution form. Also, the combination of solvent, fluoroelastomer and crosslinking and/or curing agent, should react so as to prevent the formation of precipitates or crystallites which tend to clog the filters and pump of the flow coating apparatus, and which may cause bubbles or defects in the final coated fuser member. Further, the solvent and crosslinking or curing agents must possess properties which allow for the coating solution of solvent, fluoroelastomer, crosslinking agent or curing agent to remain in solution form during the entire flow coating manufacturing process which may take from 8 hours to a few days.

Examples of suitable solvents include effective solvents. Effective solvents as used herein are solvents which when mixed with a fluoroelastomer and curing or crosslinking agents, possess the ability to completely dissolve the fluoroelastomer in order to enable the fluoroelastomer to be flow coated, without allowing for precipitates to form during the flow coating process. Preferred solvents have the ability to completely dissolve the curing/crosslinking agent and are compatible with the fluoroelastomer solvent solution enabling the coating solution to be flow coated in a manufacturing environment which may last a few days, for example from about 1 to about 4 days. Effective solvents include polar solvents such as water, methyl alcohol, ethyl alcohol, acetone, methyl ethyl ketone and methyl iso-butyl ketone, along with the Wittig reaction solvents such as dimethyl formamide (DMF), dimethyl sulfoxide (DMSO) and N-methyl 2 pyrrolidone (NMP). Preferred solvents are the Wittig reaction solvents, and particularly preferred are dimethyl formamide (DMF), dimethyl sulfoxide (DMSO) and N-methyl 2 pyrrolidone (NMP). Of these, N-methyl 2-pyrrolidone is particularly preferred since DMF is a possible carcinogen and DMSO generates environmentally unfriendly sulfur by-products upon thermal oxidation. Specifically, the solvent is added in an amount of from about 60 to about 90 percent, preferably from about 65 to about 85 percent by weight of total solids.

The preferred curing and/or crosslinking agents are the nucleophilic curing agents such as VITON CURATIVE VC-50® which incorporates an accelerator (such as a quaternary phosphonium salt or salts like C-20) and a crosslinking agent (bisphenol AF or C-30); DIAK 1 (hexamethylenediamine carbamate) and DIAK 3 (N,N'-dicinnamylidene-1,6 hexanediamine). The curing and/or crosslinking agent is added in an amount of from about 1 to about 10 weight percent, and preferably from about 2 to about 7 weight percent of fluoroelastomer solids.

It is preferred that the viscosity of the flow coating solution comprising a fluoroelastomer, nucleophilic crosslinking agent and effective solvent, be from about 200 to about 3500, and preferably from about 250 to 2500 centipoise. Viscosities in this range provide adequate flowability and enable thin coatings which exhibit superior adhesion. It is also desirable for the coating solution to be slow drying in order to avoid trapping solvent in the underlayers which may cause bubble formation. In addition, it is desirable to evaporate the solvent and "cure" the fluoroelastomer in the range of from about 5 to about 60 minutes.

Other adjuvants and fillers may be incorporated in the elastomer in accordance with the present invention as long as they do not affect the integrity of the fluoroelastomer. Such fillers normally encountered in the compounding of elastomers include coloring agents, reinforcing fillers, and processing aids.

Any suitable release agent may be used including polyorganosiloxane fluids, amino oils, and the like. Preferred polymeric fluid release agents are those having functional groups which interact with the metal oxide particles in the fuser member in such a manner to form an interfacial barrier at the surface of the fuser member while leaving a non-reacted low surface energy release fluid as an outer release film. Examples of suitable release agents having functional groups include those described in U.S. Pat. Nos. 4,046,795; 4,029,827; and 4,011,362; 4,101,686; 4,146,659; 4,150,181; 4,185,140; 4,515,884; 5,395,725; and 5,493,326. In preferred embodiments, the chemically reactive groups of the polymeric release agents are mercapto, carboxy, hydroxy, isocyanate, epoxy and amino. Preferred amino functional oils include those disclosed in, for example, U.S. Pat. Nos. 5,512,409; 5,516,361 and 5,531,813. Other preferred fuser oils include hydride oils such as those disclosed in U.S. Pat. No. 5,401,570.

The flow coating solution comprising an effective solvent, fluoroelastomer, and crosslinking or curing agent can be coated on the fuser roll substrate preferably by means of a new coating procedure referred to as flow coating. The flow coating procedure will now be described in detail with reference to the drawings. In FIG. 1, a fuser roll is depicted as an example of a preferred embodiment of the invention. However, the present invention is useful for coatings of fuser belts, films, and the like; donor rolls, belts, films, and the like; pressure rolls, belts, films and the like; and like fuser members.

Referring to FIG. 1, the apparatus 100 is used to apply coating solution 102 to periphery 104 of the fuser roll 48. The coating solution is pumped via pump 106 through a conduit typically in the form of a pipe 110 to an applicator 112 including nozzle 114 through which the coating solution 102 flows onto periphery 104 of the roll 48.

The coating solution 102 is applied to the periphery 104 in a spiral fashion in which the fuser roll 48 rotates about its longitudinal axis 116 while in a horizontal position, while the applicator 112 translates in a direction parallel to the longitudinal axis 116 of the fuser roll 48 along the length of the substrate in a horizontal position. The coating solution 102 is thus applied to the periphery 104 of the fuser roll 48 in a spiral fashion. The application of the coating is similar to the path of a cutting tool when turning the periphery of a shaft in a standard lathe. By accurately controlling the amount of coating solution 102 that is displaced through pump 106 and/or by controlling accurately in any manner the amount of coating solution 102 that is released at the nozzle 114 of applicator 112, substantially all the coating solution 102 that passes through the nozzle 114 adheres to the roll 48. The amount of coating released through the applicator per rotation in order to obtain sufficient coating depends mostly on the viscosity of the coating, the size (circumference and length) of the fuser member to be coated, the desired thickness of the layer, the rate of flow of the coating, and other like parameters. By making the correct calculations, flow coating can be achieved wherein substantially all of the coating from the applicator adheres to the surface of the fuser member. "Substantially all" as used herein means from about 80 to about 100 percent of the coating initially released from the nozzle will adhere to the fuser member. Preferably from about 95 to about 100 percent will adhere to the fuser member. In other words, preferably about 95 to about 100 percent of the solution coating of solvent, fluoroelastomer and curing or crosslinking agent applied to the substrate adheres to the substrate.

Using flow coating, a very fine coating may be precisely coated onto a substrate. In particular, Applicants have been successful in obtaining a coating layer of about 0.0020 inches with a tolerance range of +/−0.0001 inches. Being able to control the thickness of the coating with such precision will virtually obviate the need for grinding and other post coating operations particularly for use in fusing color images where glossy finish on images is preferred. For black and gray tone images where a flat image is preferred, however, the surface may be too smooth following flow coating. Therefore, subsequent grinding and or polishing operations may be required to obtain the preferred dull or flat finish.

Apparatus 100 may have any suitable form and consists of any equipment capable of rotating the fuser roll 48 about longitudinal axis 116 while translating the applicator 112 in a direction parallel to the longitudinal axis 116 of the fuser roll. Standard CNC (computerized numerical control) or engine lathes may be used for this purpose. Specialty equipment may also be designed which will rotate the fuser roll while translating the applicator. Specialized equipment may be advantageous to permit the proper enclosure of the apparatus 100 to contain possible volatile coating solutions and to maintain specific environmental conditions necessary for quality coatings from this process.

When applying the coating using an apparatus 100 with an applicator 112 which applies a spiral coating through the nozzle 114, the coating is applied in a thread-like fashion and may have peaks and valleys on the periphery 104 of the roll 48. The placement of a member in the form of guide 120 against the periphery 104 of the roll 48 as the coating solution 102 is applied to the roll, significantly improves the uniformity of the coating upon the roll 48. Preferably, the longitudinal axis 116 of the roll 48 is positioned horizontally with respect to the floor of the building in which the apparatus is housed. This configuration permits for the affects of gravity to properly distribute the coating solution 102 about the periphery 104 of the roll 48. Further details of this preferred embodiment of the present invention, wherein a blade is used at the periphery of the roll in order to improve the uniformity of the coating, are provided in U.S. Pat. No. 5,871,832,entitled, "Leveling Blade for Flow Coating Process for Manufacture of Polymeric Printer Roll and Belt Components."

Similarly, the applicator 112 is preferably positioned above the fuser roll 40 so that the stream of coating solution coming from the nozzle 114 may rest upon the periphery 104 of the roll 48. Preferably, tip 120 of nozzle 114 is spaced a distance H above the periphery 104 of the roll 48. If the tip 120 is placed too far from the periphery 104 the coating solution 102 will evaporate before it reaches the periphery. If the tip 120 is placed too closely to the periphery 104, the tip will hit the periphery 104. For a roll having a diameter D of approximately four inches, a distance H of approximately ¼ of an inch is adequate. Positioning of the applicator 112 at a position F of approximately one inch from vertical axis 122 of the roll in the direction of rotation 124 of the roll is sufficient. The dynamics of the rotation of the roll and its position on the periphery of the roll assist in the uniform distribution of the solution 102 on the periphery of the roll.

Figure 2:
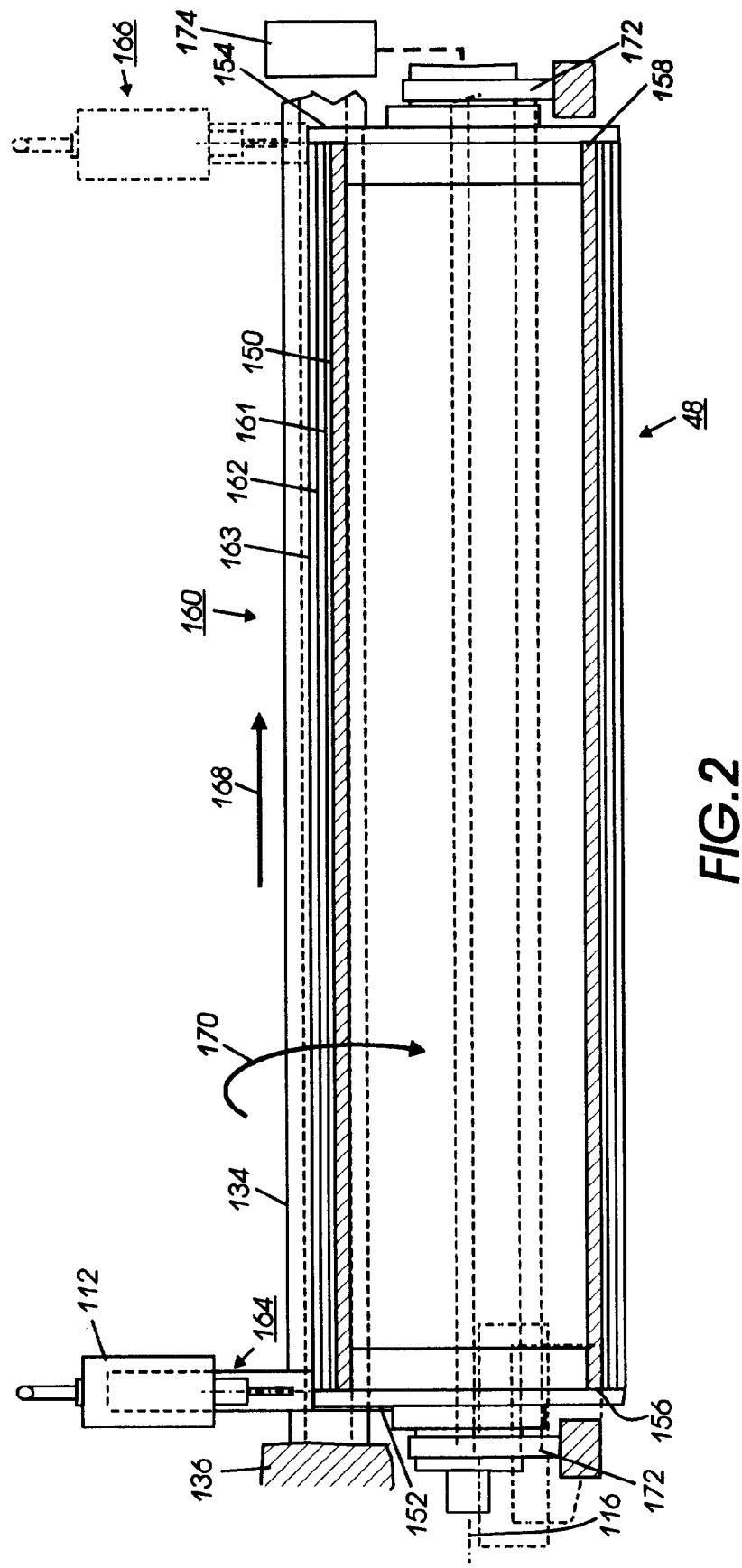
FIG. 2 is a sectional view along the line 4—4 in the direction of the arrows of the FIG. 1 fuser roll.

Referring now to FIG. 2, the fuser roll 48 and the apparatus 100 are shown in greater detail. The fuser roll 48 may be made of any suitable durable material which has satisfactory heat transfer characteristics. For example, as shown in FIG. 2, the fuser roll 48 includes a substrate in the form of a core 150 having a generally tubular shape and made of a thermally conductive material, for example, aluminum or a polymer. To provide for the driving of the roll, the roll 48 typically includes first end cap 152 and second end cap 154 located at first end 156 and second end 158 of the core 150, respectively.

The operation of the apparatus as shown in FIG. 2 is such that the applicator 112 translates from first position 164 as shown in solid to second position 166 as shown in phantom. The applicator 112 thus travels along with the slide 134 in the direction of arrow 168. The direction of travel of the applicator 112 is parallel to longitudinal axis 116 of fuser roll 48. Concurrently with the translation of the applicator 112, the roll 48 rotates in the direction of arrow 170. The roll 48 is supported in any suitable fashion such as by feed blocks 172 and is rotated in any suitable fashion such as by driver 174 which contacts end cap 154.

The flow coating process for a fuser roll includes first the step of providing a generally cylindrical shaped substrate. The substrate is rotated about a longitudinal axis of the substrate. A fluid coating is applied to the periphery of the substrate in a spiral pattern utilizing a guide to direct the coating onto the periphery of the substrate. After the coating is fully applied, the coating is ground to a precision tolerance. To obtain optimum surface configuration, subsequent operations such as super-finishing or polishing the outer periphery may also be required.

The coating may be applied in a solution with coating additives. Such a solution with approximately from about 10 to about 40, preferably about 15 to about 35 percent solids has been found to be effective. The coating may be applied at any satisfactory rate. Applicants have found that a thickness rate of from about 0.001 to about 0.005 inches, and preferably about 0.002 inches per pass is most effective. This is the thickness which is applied along the length of the roll during the roll's rotation. This amount is the amount that allows for substantially all of the coating applied to remain on the roll without dripping off or clumping up.

When using the flow coating process to produce belts or films, the belts or films are preferably mounted on a cylindrical mandrill and processed in a manner process similar to that heretofore described, with the outer surface of the belt being coated.

Figure 3:
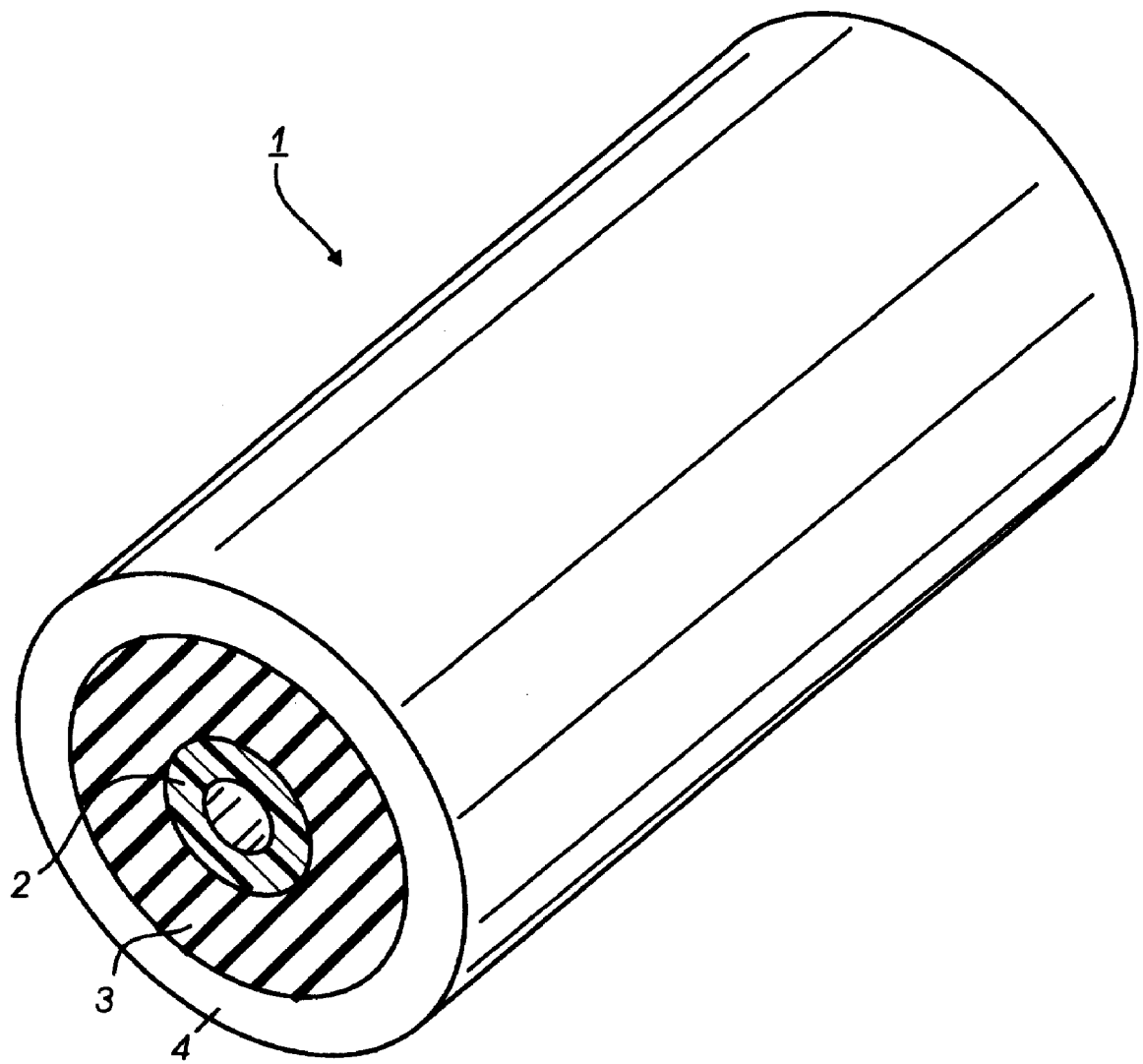
FIG. 3 is an enlarged view of a fuser roll demonstrating an embodiment of the present invention.

Referring to FIG. 3, an embodiment of the present invention is depicted, wherein the fuser roll 1 prepared by a flow coating process comprises a substrate 2 and thereover an adhesive layer 3 and an fusing layer 4. In a preferred embodiment of the present invention, the substrate is a hollow cylindrical metal core. The adhesive layer 3 is preferably an amino silane adhesive layer and the outer layer 4 is preferably a fluoroelastomer layer.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I

An amount of 25–35% by weight of total solids of DuPont VC-50 was dispersed in methyl isobutyl ketone (MIK), methyl ethyl ketone (MEK), dimethyl formamide (DMF), dimethyl sulfoxide (DMS) and n-methyl pyrrolidone (NMP), respectively. Each of the mixtures were dispersed by hand shaking in transparent glass bottles until all the VC-50 was dispersed. The mixtures were allowed to stand for approximately 15 minutes and then inspected for settling. The samples dissolved in the ketone solvents (MIK and MEK) exhibited a clear precipitate of platelets. These platelet precipitates appeared to be an undissolved fraction of the two part VC-50 or, possibly, indicative that some reaction had taken place with the solvent. Such a precipitate could potentially cause coating defects or inadequate crosslinking during curing steps of the process. The dimethyl formamide, dimethyl sulfoxide and n-methyl pyrrolidone samples did not exhibit the platelet precipitates that the ketone solvents produced. The n-methyl pyrrolidone was found to possess lower toxicity. Further, n-methyl pyrrolidone did not show any impact on physical properties of the solution. Moreover, n-methyl pyrrolidone possessed good shelf life stability.

Each of the above testing solvent solutions was used in a flow coating solution (28 weight percent VITON® GF and 72 weight percent solvent solution). The flow coating solution was flow coated on a substrate, flashed-off and then cured and post cured using known procedures. The tensile strength, elongation and tensile modulus were measured to assure that nothing deleterious occurred to the fluoroelastomer through the use of the solvents. All the samples showed good results as shown in the following Table I. The results represent an average of six samples for each solvent. The n-methyl pyrrolidone also demonstrated improved the pot life, or stability of the viscosity, and improved tensile strength and initial modulus over the working time of the coating solutions.

The results in Table I below, along with the results of the precipitation test described above, demonstrate that DMF, DMS and NMP possess the desired qualities needed for flow coating, and also do not adversely affect the desired properties of the flow coated fluoroelastomer, as compared to known solvents.

TABLE I

| SOLVENT | POT LIFE (HOURS) | TENSILE STRENGTH (PSI) | ELONGATION AT BREAK (%) | INITIAL MODULUS (PSI) |
|---|---|---|---|---|
| MIK | 180 | 1150 | 375 | 465 |
| MEK | 180 | 1200 | 380 | 480 |
| DMS | 125 | 1200 | 339 | 295 |
| DMF | 160 | 1100 | 350 | 310 |
| NMP | 200 | 1450 | 320 | 526 |

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A flow coating solution consisting essentially of a fluoroelastomer, a nucleophilic crosslinking agent, and an effective solvent selected from the group consisting of N-methyl 2-pyrrolidone, dimethyl formamide, and dimethyl sulfoxide.

2. A flow coating solution as claimed in claim 1, wherein said effective solvent is N-methyl 2-pyrrolidone.

3. A flow coating solution as claimed in claim 1, wherein said nucleophilic crosslinking agent comprises a material selected from the group consisting of a bisphenol, a quaternary phosphonium salt, hexamethylenediamine carbamate, N, N'-dicinnamylidene-1,6 hexanediamine, and mixtures thereof.

4. A flow coating solution as claimed in claim 3, wherein said nucleophilic crosslinking agent comprises a bisphenol and a quaternary phosphonium salt.

5. A flow coating solution as claimed in claim 1, wherein said fluoroelastomer is selected from the group consisting of a) copolymers of vinylidene fluoride, hexafluoropropylene and tetrafluoroethylene b) terpolymers of vinylidene fluoride, hexafluoropropylene and tetrafluoroethylene, and c) tetrapolymers of vinylidene fluoride, hexafluoropropylene, tetrafluoroethylene and a cure site monomer.

6. A flow coating solution as claimed in claim 5, wherein said fluoroelastomer comprises 35 mole percent of vinylidenefluoride, 34 mole percent of hexafluoropropylene, 29 mole percent of tetrafluoroethylene and 2 mole percent of a cure site monomer.

7. A flow coating solution as claimed in claim 1, wherein said flow coating solution has a viscosity of from about 200 to about 3500 centipoise.

8. A flow coating solution as claimed in claim 1, wherein said fluoroelastomer is present in an amount of from about 15 to about 35 percent by weight of total solids.

9. A flow coating solution as claimed in claim 1, wherein said crosslinking agent is present in an amount of from about 2 to about 6 percent by weight of total solids.

10. A flow coating solution as claimed in claim 1, wherein said effective solvent is present in an amount of from about 65 to about 85 percent by weight of total solids.

11. A flow coating solution as claimed in claim 1, wherein said coating is applied to a substrate at a thickness of from about 0.001 to about 0.005 inches per pass.

12. A flow coating solution as claimed in claim 1, wherein from about 95 to about 100 percent of said coating solution applied to a substrate adheres to said substrate.

13. A fuser member comprising a substrate and a fluoroelastomer layer, wherein said fluoroelastomer layer is prepared by flow coating a flow coating solution to said substrate by rotating the substrate in a horizontal position about a longitudinal axis thereof and simultaneously applying the flow coating solution from an applicator to the substrate in a spiral pattern in a controlled amount so that substantially all the coating from the applicator adheres to said substrate, wherein said flow coating solution consists essentially of a fluoroelastomer, a nucleophilic crosslinking agent, and an effective solvent selected from the group consisting of N-methyl 2-pyrrolidone, dimethyl formamide, and dimethyl sulfoxide.

14. A fuser member as claimed in claim 13, wherein said nucleophilic crosslinking agent comprises a bisphenol and a quaternary phosphonium salt.

15. A fuser member as claimed in claim 13, wherein said fluoroelastomer is selected from the group consisting of a) copolymers of vinylidene fluoride, hexafluoropropylene, and tetrafluoroethylene, b) terpolymers of vinylidene fluoride, hexafluoropropylene and tetrafluoroethylene, and c) tetrapolymers of vinylidene fluoride, hexafluoropropylene, tetrafluoroethylene and a cure site monomer.

16. A fuser member as claimed in claim 13, wherein said fluoroelastomer layer further comprises a metal oxide dispersed therein.

17. A fuser member as claimed in claim 16, wherein said metal oxide is selected from the group consisting of cupric oxide, aluminum oxide and mixtures thereof.

18. A method of flow coating comprising coating a flow coating solution to a substrate by rotating the substrate in a horizontal position about a longitudinal axis thereof and simultaneously applying the flow coating solution from an applicator to the substrate in a spiral pattern in a controlled amount so that substantially all the coating from the applicator adheres to said substrate, wherein said flow coating solution consists essentially of a fluoroelastomer, a nucleophilic crosslinking agent, and an effective solvent selected from the group consisting of N-methyl 2-pyrrolidone, dimethyl formamide, and dimethyl sulfoxide.

19. A method in claimed in claim 18, wherein from about 95 to about 100 percent of said coating applied to said substrate adheres to said substrate.

20. An image forming apparatus comprising:

a charge-retentive surface to receive an electrostatic latent image thereon;

a development component to apply toner to said charge-retentive surface to develop said electrostatic latent image to form a developed image on said charge retentive surface;

a transfer component to transfer the developed image from said charge retentive surface to a copy substrate; and a fuser member for fusing toner images to a surface of said copy substrate, wherein said fuser member comprises: a substrate and a fluoroelastomer layer, wherein said fluoroelastomer layer is prepared by flow coating a flow coating solution on said substrate by rotating the substrate in a horizontal position about a longitudinal axis thereof and simultaneously applying the flow coating solution from an applicator to the substrate in a spiral pattern in a controlled amount so that substantially all the coating from the applicator adheres to said substrate, wherein said flow coating solution consisting essentially of a fluoroelastomer, a nucleophilic crosslinking agent, and an effective solvent selected from the group consisting of N-methyl 2-pyrrolidone, dimethyl formamide, and dimethyl sulfoxide.

21. A flow coating solution comprising essentiallly of i) a fluoroelastomer selected from the group consisting of a) copolymers of vinylidene fluoride, hexafluoropropylene and tetrafluoroethylene, b) terpolymers of vinylidene fluoride, hexafluoropropylene and tetrafluoroethylene, and c) tetrapolymers of vinylidene fluoride, hexafluoropropylene, tetrafluoroethylene and a cure site monomer, ii) a nucleophilic crosslinking agent comprising a bisphenol and a quaternary phosphonium salt, and iii) an effective solvent selected from the group consisting of N-methyl 2-pyrrolidone, dimethyl formamide, and dimethyl sulfoxide.

* * * * *